Nov. 7, 1933.  J. N. REYNOLDS ET AL  1,934,375
FLUID PRESSURE INDICATOR AND CONTROL
Filed Aug. 15, 1921  3 Sheets-Sheet 2

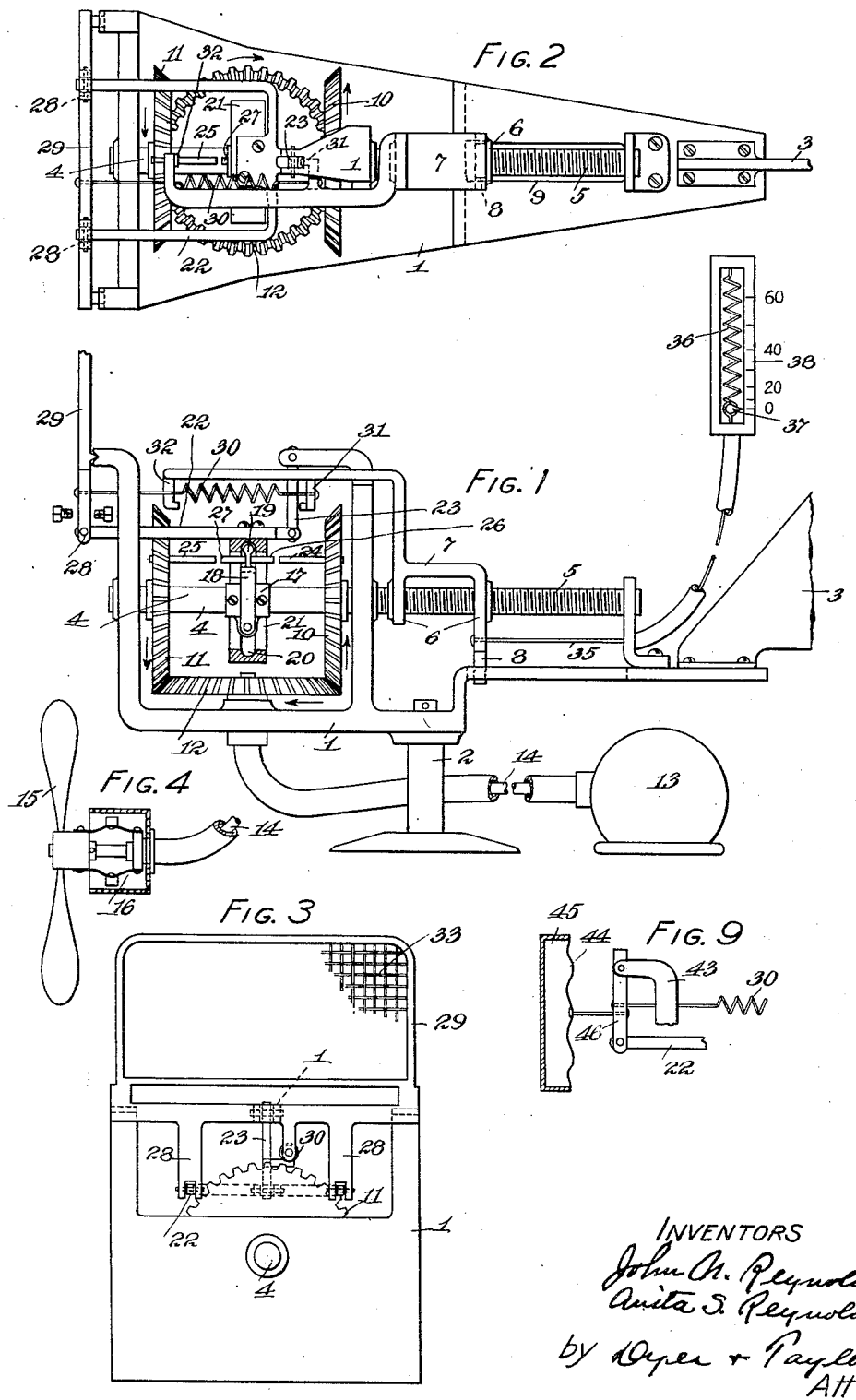

INVENTORS
John N. Reynolds
Anita S. Reynolds
by Dyer + Taylor
Att'ys

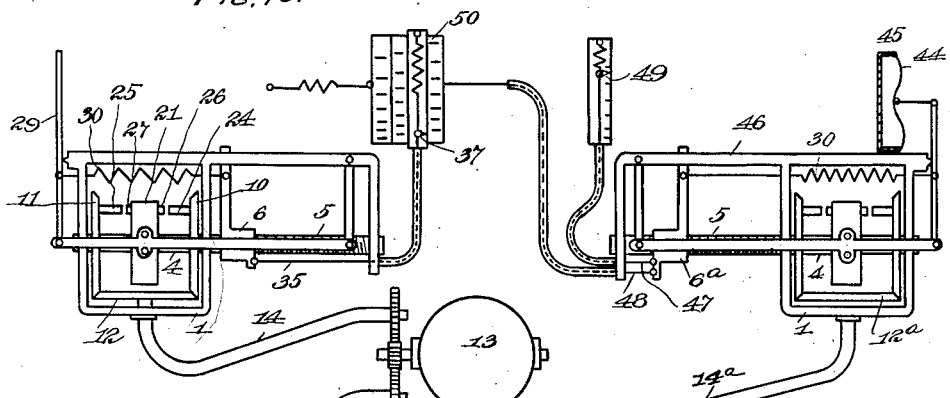
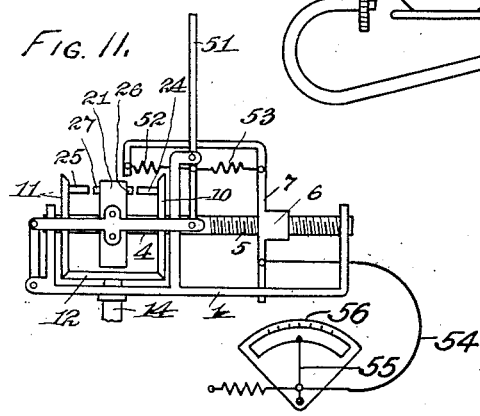
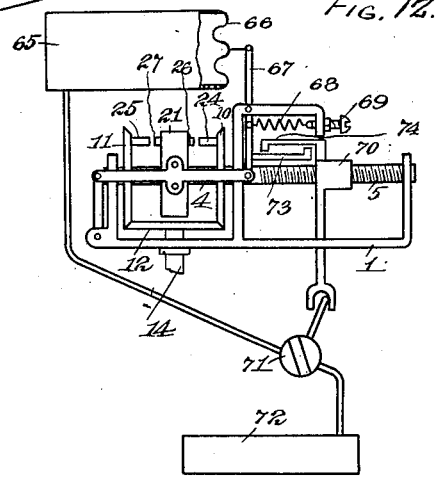

Patented Nov. 7, 1933

1,934,375

UNITED STATES PATENT OFFICE 1,934,375

FLUID PRESSURE INDICATOR AND CONTROL

John N. Reynolds and Anita S. Reynolds, Greenwich, Conn.

Application August 15, 1921. Serial No. 492,394

18 Claims. (Cl. 73—2)

The invention relates to mechanism for measuring, and indicating the flow of fluids, such as air, gases and liquids, and for determining the relative speeds of objects or elements by measurements of the forces created due to their movements.

Some of the particular applications of the invention are the determination and indication of the speed of aircraft; the determination and indication of the relative speeds of different portions of aircraft, for example; the speed of the wind over the earth's surface; for determining barometric pressure, and in this connection for determining and indicating the altitude of aircraft; for determining and indicating the depth and speed of vessels in water; for determining and indicating the flow of fluids through pipes; to indicate and control the static pressure of fluids; to control and regulate pressures in pipes and systems, and for many other purposes.

One of the objects of the present invention is to provide means for measuring and indicating the movements of fluids and the like which will be extremely sensitive to changes in pressure, which will accurately measure very slight changes in speed or in pressure, and which will be strong and rugged in construction.

A further object is to provide means, other than the elements relied upon for indicating the pressure, for operating the device.

A further object is to provide means whereby suction on the side of the element opposite that exposed to the fluid, is minimized.

A further object is to provide means whereby the accumulation of frost, snow and ice on the exposed portions of the device will be prevented.

A further object is to provide means whereby readings either visual, audible or otherwise may be taken at any number of points removed from the apparatus, and to provide means of a substantial nature for recording such readings.

A further object is to provide means whereby the device will be automatically held in proper position to receive the pressure to be measured.

These and further objects will more fully appear in the following specification and accompanying drawings considered together or separately.

In the accompanying drawings which illustrate one embodiment of the invention, like parts in all of the several figures are designated by corresponding characters of reference, and in which Fig. 1 is a side elevation of a form of apparatus for indicating wind speeds.

Fig. 2 is a plan view of the same.

Fig. 3 is a front elevation of the same.

Fig. 4 is a side elevation partly in section of a modified form of driving mechanism.

Fig. 9 is a diagrammatic view showing the device adapted to measure static pressure.

Fig. 10 is a diagrammatic side elevation illustrating the device as applied to an air craft for registering air speed and altitude.

Fig. 11 is a diagrammatic side elevation of the device adapted as a slip indicator for aircraft.

Fig. 12 is a diagram illustrating the device as employed to maintain a predetermined pressure in a tank or the like.

Figure 5:
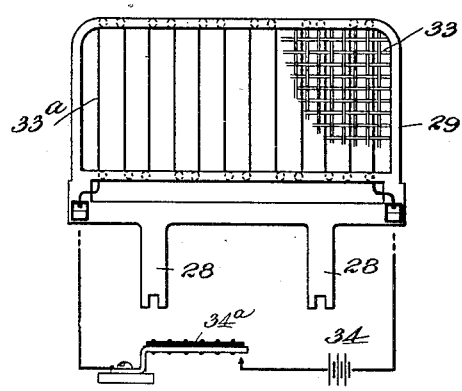
Fig. 5 is a detail, diagrammatic elevation showing means for heating the exposed portions of the apparatus.
Figure 6:
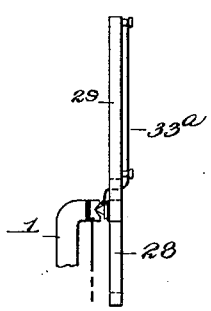
Fig. 6 is a side elevation of the same.

Referring particularly to Figs. 1, 2, 4, 5 and 6, the device comprises a frame 1 pivoted on a vertical stud 2 and capable of oscillating in the horizontal plane, and is provided with a vane 3 whereby that portion of the frame on the opposite side of the stud 2 from the vane will be held in the wind.

Mounted in bearings in the frame 1 is a shaft 4 having a screw thread portion 5 with which a nut, or nuts, 6 carried by a carriage 7 cooperates. The carriage is provided with a finger 8 which enters an elongated slot 9 in the frame 1 whereby when the shaft 4 is rotated the nut 6 will be prevented from turning, and the carriage will be caused to move back and forth along the shaft as the latter is rotated in one direction or the other.

Loosely mounted on the shaft 4 are two spaced, oppositely disposed bevel gears 10 and 11 each of which meshes with, but on opposite sides of, a bevel gear 12 rotatably mounted in the frame 1. The shaft of the gear 12 may be driven from any desired source of power. In Figs. 2 and 10 the source of power is illustrated as an electric motor 13 connected to the shaft of the gear 12 by means of a flexible shaft 14 whereby the motor may be situated at a distance from the device.

In Fig. 4 a screw propeller 15 is shown as connected to the shaft 14. The propeller will be operated by the wind and is preferably supported on the front of the frame 1, and will thus be held in the wind by the vane 3. If desired a centrifugal governor 16 may be positioned on the shaft to limit the speed of the propeller or other motor.

Rigidly secured to the shaft 4 between the gears 10 and 11 is a block 17 to which is pivoted a clutch member 18 having a spherical projection 19 which works within an annular recess 20 in a ring block 21 which surrounds the shaft 4, block 17 and member 18. The ring block 21 is carried by a U-shaped yoke 22 connected at one end by a pivoted link 23 to a projecting portion of the frame 1.

The gear 10 is provided with a projecting member 24 parallel to the shaft 4, and the gear 11 carries a similar member 25. The members project toward each other. The clutch member 18 is provided with two projections 26 and 27, and the members 24, 25, 26 and 27 are the same radial distance from the center of the shaft 4. When the parts are in normal position as shown in Fig. 1, the gears 12, 10 and 11 may rotate without affecting the shaft 4. When, however, the clutch member 18 is swung to one side or the other the projection 26 or 27 will engage either the member 24 or 25 and the shaft 4 will be rotated in one or the other direction as the case may be.

The legs of the yoke 22 project through the frame 1 and are pivoted to arms 28 depending from a vane 29 pivoted on knife edges in a normally vertical position in the frame 1. The vane 29 is on the opposite side of its pivotal points from the arms 28 whereby when the vane is moved in one direction the arms will be moved in the opposite direction.

Attached to the vane below its pivotal point is one end of a weighing spring 30 the opposite end of which is secured to the carriage 7, and the latter is provided with a pair of oppositely disposed stops 31 and 32 adapted to engage the link 23, to limit the movement of the carriage in both directions, and reset the device.

The vane 29 consists of a frame over which is stretched a foraminous screen 33 preferably of wire cloth, and interwoven with the cloth is a high resistance wire 33a carrying current from a battery 34 and over the surface of the screen whereby the temperature of the vane may be raised to prevent the accumulation of frost, snow and ice on the vane. The openings in the vane surface will reduce the suction on the rear thereof and the vane will respond more accurately to air pressure on its front side. If desired a thermostat 34a, or other device, may be placed in the circuit 33a to close the same at certain temperatures.

Attached to the rear end of the carriage 7 is a rod 35 which may be, and preferably is, a section of piano wire which may be led through a sheath of any desired length and be curved to any shape. The end of the wire 35 is attached to one end of a properly tensioned spring 36 the opposite end of which is anchored. A pointer 37 is attached to the wire and cooperates with a scale 38 by means of which the movements of the carriage may be read.

The device above described may be set up on an air craft, on a tower on land, a ship at sea or any other desired position, and the scale may be placed at a distance from the device and in convenient reach of the observer.

The operation of the apparatus as above described, is as follows:

The support 2 is secured in the desired position with the apparatus exposed to the wind. The vane 3 will fly with the wind and the vane 29 will be brought broadside to the wind, and preferably in the vertical position. When it is desired to take an observation, the motor 13 is started and the gears 10 and 11 are caused to rotate in opposite directions, but as they are loose on the shaft 4 they will run idle.

The force of the wind against the screen 33 will force the vane 29 backward on its knife edge pivots. This movement draws the yoke 22, and with it the ring 21, forward. The engagement of the head 19 of the clutch member 18 with the groove 20, and its pivotal connection with the block 17, will move the projection 27 to a position in the path of the projection 25 in the gear 11. This will cause the shaft 4 to be rotated in the same direction as that of the said gear.

The rotation of the shaft will move the nut 6, and with it the frame 7, toward the rear in the direction of the vane 3, and the spring 30 will be stretched and its tension gradually increased until it reaches a tension sufficient to overcome the force of the wind and move the vane 29 back to the normal, vertical position, which movement disengages the clutch member from the gear 11 and stops the rotation of the shaft.

As the nut moves back, as above described, the tension of the spring 36 will pull the wire or rod 35 through the sheath and the position of the pointer 37 on the scale 38 will indicate the amount the spring 30 has been extended which, the instrument having been properly calibrated, will indicate the wind speed in miles per hour.

When the wind speed lessens, the spring 30 will, by its tension, move the vane 29 forward beyond the vertical plane, and the ring frame 21 will be moved to the rear thus causing the projection 26 of the member 18 to be engaged by the member 24 of the gear 10, the shaft 4 will be rotated in the opposite direction and the nut 6 will move forward, the tension of the spring 30 will be reduced, the pointer 37 will be drawn back over the scale 38 and the spring 36 will again be placed under tension. When the tension of the spring 30 is reduced sufficiently to permit the vane 29 to assume the vertical position the clutch is disengaged and the pointer 37 will indicate the position.

Should the wind speed become abnormal or reach hurricane proportions, the stop 32 will engage the link 23 and disengage the clutch member from the gear 11 and move the ring 21 to neutral position and bring the shaft 4 to rest.

As shown in Fig. 4 the shaft 14 may be provided with a propeller 15 for driving the apparatus by wind power. Obviously the propeller will be placed in such a position that it will receive the full wind power. The wind motor is particularly adapted for use on aircraft because of its small weight.

Figure 7:
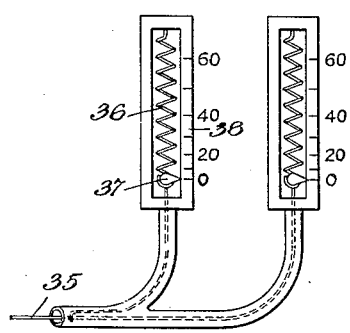
Fig. 7 is a detail elevation of a form of multiple indicator.

As shown in Fig. 7 the rod or wire 35 may have a plurality of ends each being atached to a spring such as 36 carrying a pointer such as 37, and each pointer cooperating with a scale such as 38. By means of this arrangement readings may be taken at widely separated points.

Figure 8:
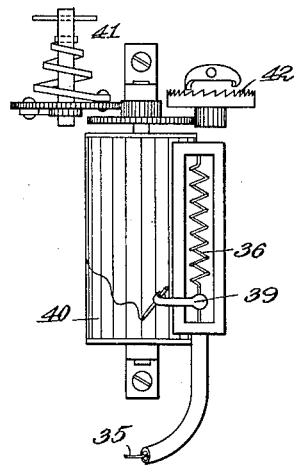
Fig. 8 is a detail elevation of a combined indicating and recording device.

As shown in Fig. 8 the indicating pointer 39 of the wire 35 carries a marker adapted to make a permanent record on the surface of a drum or other moving element 40, which is moved by a motor such as a clockwork 41 caused to move at a definite speed by an escapement 42.

In the embodiment of the invention illustrated in Fig. 9 the pivoted frame 1 is not used and instead thereof a stationary support, an arm 43 of which is shown, is employed. The shaft, screw, miter gears, motor, clutch, yoke, weighing spring, and scale are used as before. A diaphragm 44 stretched over the mouth of a chamber 45 from which the air has been exhausted, is substituted for the vane 29. A lever 46 is pivoted to the arm 43, the yoke 22 is connected to the free end of the lever, the weighing spring 30 is connected to the lever between the pivotal points thereof and those of the yoke, and the diaphragm is secured at its center to the yoke between said pivotal points.

The diaphragm will naturally be flexed into the chamber by the air pressure outside thereof. The spring 30 will be extended by movement of the nut 6, as described in connection with Fig. 1, until its tension balances the air pressure on the diaphragm. At this point the clutch is thrown into central position and the movement of the nut is arrested.

As the air pressure decreases due to changes in atmospheric conditions or to an increase in altitude, the clutch will be thrown into reverse position and the tension of spring 30 decreased until a balance is reached. The movement of the nut, or of an element connected thereto, will be a measure of the tension of the spring 30 and may be calibrated to read in any desired unit.

The form of the instrument illustrated in Fig. 9 may be used in determining barometric pressures whereby altitude may be determined and indicated.

In Fig. 10, an air speed indicator similar to that shown in Fig. 1 is shown in conjunction with an altitude indicator such as is shown in Fig. 9. The gear 12 of the speed indicator is driven through the shaft 14 of the motor 13 as before, while the gear 12a is driven from the same motor through the shaft 14a.

The movement of the nut 6a of the altitude meter 46 controls two wires 47 and 48. The wire 47 moves a pointer 49 similar to pointer 37 which moves over a scale properly calibrated to indicate altitude. The wire 48 moves a scale 50 on which the pointer 37 of the speedometer indicates the air speed when operated by the wire 35 of the speedometer. As the altitude increases a different scale is provided for the pointer 37.

In Fig. 11 the instrument is shown in use as a slip indicator for aircraft. In this case the vane 51 is maintained parallel to the flow of the wind and in the vertical position when the wind pressure on one side equals the pressure on the other. Any tendency of the aircraft, or other structure to which the instrument may be attached, to move sideways will cause an excess of pressure on that side of the vane toward which the device is moving. If the device moves to the right the vane will be tilted to the left, causing the projections 24 and 26 to engage, thus moving the nut 6 to tension a spring 52 which will counteract the tilting of the vane and restore it to the vertical. When the vane is tilted to the left the spring 53 will be tensioned to restore it to normal.

A wire or rod 54 will move a pointer 55 over a scale 56 to indicate the direction in which the device is slipping or making leeway.

Fig. 12 shows a container 65 in which it is desired to maintain a constant pressure. A diaphragm 66 is stretched over one end of the container. Said diaphragm is attached to one end of a pivoted lever 67 the opposite end of which is connected to a clutch mechanism similar to that shown in Fig. 1. A tension equivalent to the desired pressure is placed on a spring 68 which is attached to the same end of the lever 67 as is the clutch mechanism, and the tension of which may be adjusted by a screw 69.

If the pressure in 65 drops the diaphragm will flex inward and the lever will engage the clutch to move the nut 70 in the direction to open a valve 71 permitting fluid, from a reservoir 72 containing the fluid under pressure, to enter the receptacle. When the pressure is reestablished in the receptacle the diaphragm will be flexed outward, the lever will cause the nut to move in the opposite direction and the valve will be closed.

The lower end of the lever 67 carries a finger 73 adapted to engage a finger 74 carried by the nut 70. The finger 73 is adapted to engage the support of the finger 74 when the valve 71 is closed, and a spur thereon is adapted to engage a similar spur on the finger 74 when the valve is wide open thus limiting the travel of the nut in both directions.

This application is a continuation, in part at least, of an application for patent filed by us on or about the 22nd day of March, 1918, and given Serial Number 223,969.

In accordance with the provisions of the patent statutes, we have described the principle of our invention together with the apparatus which we now consider to represent the best embodiment thereof; but we desire to have it understood that the apparatus shown is merely illustrative and that the invention may be carried out in other ways.

The invention having been described, what is claimed as new and desired to be secured by Letters Patent of the United States, is:

1. A gauge for measuring the flow of a fluid comprising a movable vane having a surface adapted to be exposed to the flow, said vane being adapted to be displaced by the pressure of the fluid on said surface, said vane being of foraminous construction.

2. A gauge for measuring the flow of a fluid, comprising a movable vane composed of a sheet of foraminous material and adapted to be displaced by the flow to measure the velocity thereof, one surface of said vane being exposed to the flow whereby fluid may pass through the vane, and means for heating the vane.

3. A gauge for measuring the flow of a fluid, comprising a movable vane composed of a member provided with a plurality of openings and adapted to be displaced by the flow to measure the velocity thereof, one surface of said vane being exposed to the flow whereby fluid may pass through the vane, electrical means for heating the vane, and thermostatic means for operating said electrical means when the temperature reaches a predetermined point.

4. A device of the character described, comprising a power shaft, means for rotating the shaft at constant speed, a counter shaft, coupling means including a clutch interposed between said power shaft and said counter shaft, means including a vane for operating the clutch whereby the counter shaft may be rotated in either direction, and connections between the counter shaft and vane whereby the clutch will be released when the vane has reached a predetermined position.

5. A device of the character described, comprising a frame, a shaft rotatably mounted in the frame, a portion of said shaft carrying a screw thread, a pair of gears loosely mounted on the shaft, a third gear meshing with the shaft gears in such a manner that the latter will be caused to rotate in opposite directions, means for driving the third gear, a clutch member secured to the shaft, a vane pivoted to the frame and adapted to be exposed to wind pressure, connections between the vane and the clutch member whereby the latter may engage one or the other of the shaft gears and rotate the shaft in one or the other direction when the vane is moved in one direction or the other, a force exerting spring secured to the vane, a nut engaging the threaded portion of the shaft, the spring being anchored to the nut, and means for recording the movements of the nut due to the rotation of the shaft.

6. A device of the character described, comprising a horizontally pivoted frame, a shaft rotatably mounted in the frame, a portion of said shaft carrying a screw thread, a pair of gears loosely mounted on the shaft, a third gear meshing with the shaft gears in such a manner that the latter will be caused to rotate in opposite directions, means for driving the third gear, a clutch member secured to the shaft, a vane pivoted to one end of the frame and adapted to be exposed to wind pressure, a directional vane carried by the frame on the opposite end of the frame, the pivot of the frame being between the vanes whereby the pressure vane will be properly positioned relatively to the direction of the wind travel, connections between the pressure vane and the clutch member whereby the latter may engage one or the other of the shaft gears and rotate the shaft in one or the other direction when the pressure vane is moved in one direction or the other, a force exerting spring secured to the pressure vane, a nut engaging the threaded portion of the shaft, the spring being anchored to the nut, and means for recording the movements of the nut due to the rotation of the shaft.

7. A device of the character described comprising a member adapted to receive wind pressure and adapted to be displaced thereby, a spring for opposing displacement of said member by the wind pressure, means responsive to a movement of said member for changing the tension of said spring to restore said member to the position which it would normally take in the absence of wind pressure thereupon, and means for indicating at a distant point the amount of change in said tension.

8. In a flow gauge, a movable member adapted to be exposed to and displaceable by the flow, a clutch, an elastic element, one end of said element connected with said member so as to oppose its displacement, means acting on the other end of said element and through the medium of said clutch for changing the tension of said element in accordance with variations of said flow.

9. In a flow gauge, a movable member adapted to be exposed to and displaceable by the flow, an elastic element, one end of said element connected with said member so as to oppose its displacement, automatic means connected with the other end of said element for maintaining the tension of said element in balance with the force of said flow.

10. In a flow gauge, a movable member adapted to be exposed to and displaceable by the flow, an elastic element, one end of said element connected with said member so as to oppose its displacement, automatic means connected with the other end of said element for maintaining the tension of said element in balance with the force of said flow, said means being brought into operation by changes in the position of said member and means for measuring the extent of change of said tension.

11. In a flow gauge, a movable member adapted to be exposed to and displaced by the flow, an elastic element for holding said member in a certain position, a clutch under control of said member, and means for changing the tension of said element in accordance with changes in the rate of said flow, said means being controlled by said clutch.

12. In a flow gauge, a movable member adapted to be exposed to and displaceable by the flow, an elastic element, a linkage, one end of said element associated with said member to oppose its displacement and power means operating through said linkage for automatically changing the tension of said element in accordance with changes in the rate of said flow, said linkage associated with the other end of said element.

13. In a fluid flow gauge, a movable member adapted to be positioned in the path of flow of a fluid, means for resiliently opposing movement of said member from a normal position, and power means for increasing the opposition of said means first mentioned, responsive to movement of said member from normal position.

14. A device of the character described comprising a movable member adapted to be displaced by wind pressure, a spring connected at one end to said member to oppose its displacement by the wind pressure, and means responsive to a movement of said member for moving the other end of said spring to change the tension of the spring to such an extent as to restore the member to the normal position which it occupied before the wind pressure was applied.

15. In combination, a member adapted to be moved under pressure, means for resiliently opposing movement of said member from a normal position, and power means responsive to movement of said member from normal position operatively associated with said resilient means, for increasing the opposition to said movement to such degree that the effect of said pressure in moving said member from normal position is nullified.

16. A wind speed measuring device of the type described, including a member, means for mounting said member for movement in accordance with the force of the wind, calibrated spring means opposing said movement in one direction, wind operated motor means for stressing said spring so as to balance the force exerted thereby against the force exerted on said member and a plurality of indicators adapted to give indications of the force exerted on the member.

17. An air speed indicator comprising a movable member adapted to be exposed to and displaceable by the movement of the air, said member being of foraminous construction and means for indicating the force of the air causing said displacement.

18. An air speed meter comprising a movable foraminous member having a surface adapted to be exposed to air flow, said member being adapted to be displaced by the force of the air flow, means for indicating the intensity of the force acting to cause said displacement and means for heating said member.

JOHN N. REYNOLDS.
ANITA S. REYNOLDS.